Jan. 30, 1968 W. HOLZER 3,366,747

SELECTOR FOR IMPULSE SENDER

Filed Sept. 18, 1964 5 Sheets-Sheet 1

INVENTOR:

WALTER HOLZER

BY Toulmin & Toulmin

ATTORNEYS

Jan. 30, 1968 W. HOLZER 3,366,747

SELECTOR FOR IMPULSE SENDER

Filed Sept. 18, 1964 5 Sheets-Sheet 2

INVENTOR:

WALTER HOLZER

BY Toulmin & Toulmin

ATTORNEYS

Jan. 30, 1968 W. HOLZER 3,366,747

SELECTOR FOR IMPULSE SENDER

Filed Sept. 18, 1964 5 Sheets-Sheet 3

INVENTOR:

*WALTER HOLZER*

BY Toulmin & Toulmin

ATTORNEYS

SELECTOR FOR IMPULSE SENDER

INVENTOR:
WALTER HOLZER
BY Toulmin & Toulmin
ATTORNEYS

Jan. 30, 1968 W. HOLZER 3,366,747

SELECTOR FOR IMPULSE SENDER

Filed Sept. 18, 1964 5 Sheets-Sheet 5

INVENTOR.
WALTER HOLZER

United States Patent Office
3,366,747
Patented Jan. 30, 1968

3,366,747

SELECTOR FOR IMPULSE SENDER

Walter Holzer, Drosteweg 19, Meersburg (Bodensee), Baden, Germany

Filed Sept. 18, 1964, Ser. No. 397,556
Claims priority, application Germany, Sept. 19, 1963, H 50,303
8 Claims. (Cl. 179—90)

ABSTRACT OF THE DISCLOSURE

This invention relates to the field of impulse senders, especially as used in telephone equipment, wherein telephone numbers are automatically sent out through the setting of a number setting device. A constantly generating impulse sender connected into a subscriber's line during the use of the impulse sender is provided with a blocking device which renders the impulse sender ineffective after the desired number of impulses corresponding to the subscriber's number have been sent. The number setting device of the present invention comprises a first plurality of parallel contact rails superpositioned upon and insulated from, a second plurality of parallel contact rails in the form of a matrix, wherein a slide provided with a sensor means such as a ball penetrates the plane of the upper contact rails and senses the lower contact rails, said sensor also being provided with sensing means such as a sliding contact, which senses the upper contact rails.

Figure 1:
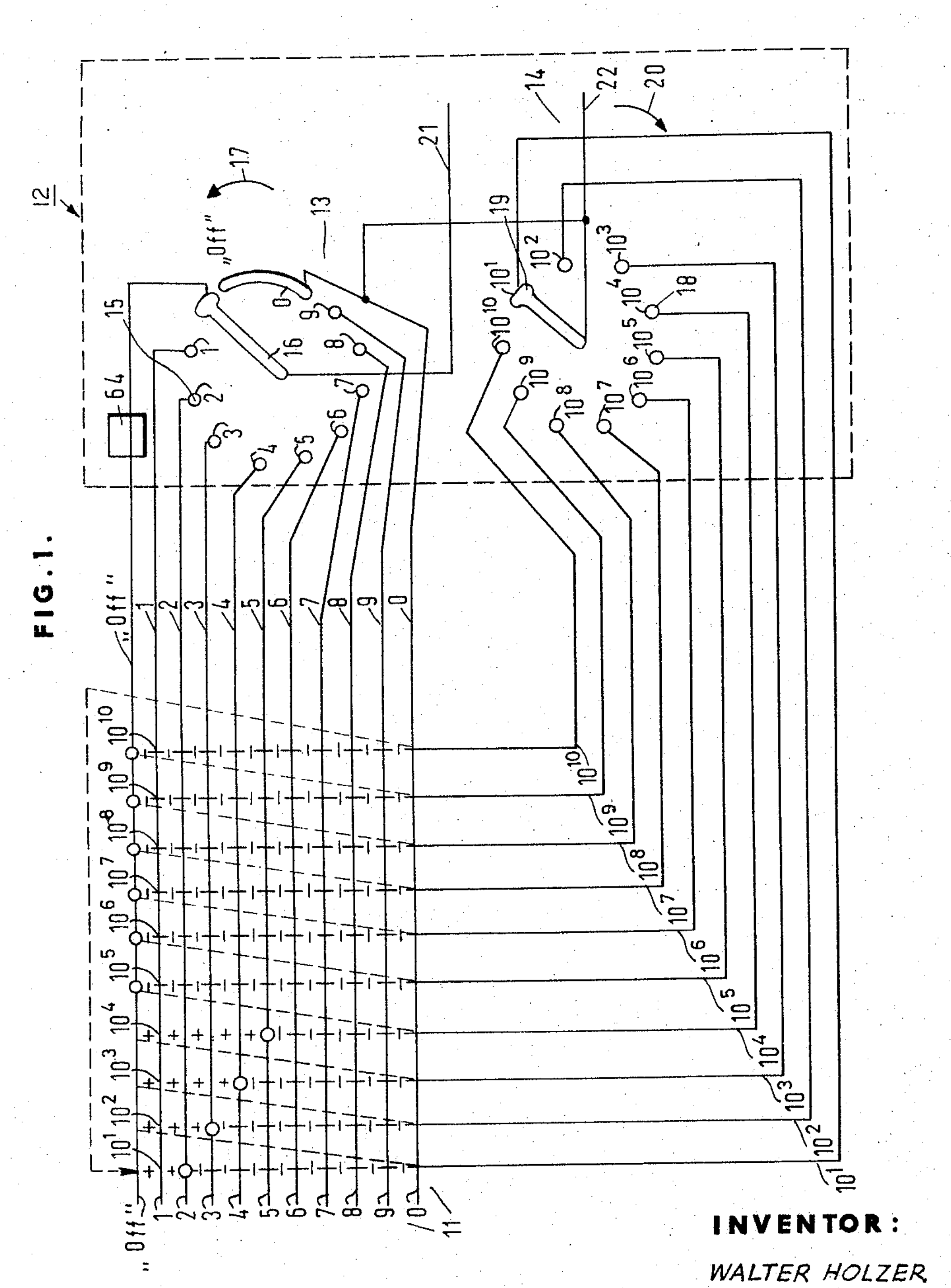

The present invention relates to automatic selection means for impulse-controlled equipment, for example for remote signalling or electric communication equipment, for the pre-selection and transmission of a plurality of successive impulse groups by an impulse sender.

Automatic selecting installations are known, equipped with a selection store in which the pre-selected impulse numbers or successive impulse groups are retained for automatic transmission, once or several times, to the impulse controlled equipment. In known installations the selection store is controlled, depending on the use to which the equipment is put, by keys, by transferring magnetically recorded impulses on to recording tape or wire, by punched tapes or punched cards, or by means of conventional hand-operated single motion type selectors.

A disadvantage of this known automatic selecting equipment is that considerable outlay on constructional elements is necessary in order that the extremely complex switching means therein can be designed for operation by laymen. In particular, a large number of rotary type switches are needed; these require a large amount of space and make operation very uncertain since they increase the probability of interference.

The reason for the large structural outlay on such installations is their high production costs, the relatively large dimensions of the equipment and the increased likelihood of trouble. It is very difficult for the users of known embodiments of the automatic selection means immediately to notice their own errors in pre-selection, since neither equipment with a dial nor equipment in which the impulse numbers are magnetically or otherwise recorded on carriers provide any opportunity of supervising the impulses which are in fact transferred from the automatic selection means to the impulse controlled equipment.

One purpose of the present invention is to provide an improved automatic selection means for impulse controlled equipment which avoids these disadvantages, which is simple and cheap to produce and which operates absolutely reliably.

Another purpose of the present invention is to design the improved automatic selection means so as to give the user an opportunity of immediately noticing and correcting his own errors when pre-selecting the desired impulses.

Yet another purpose of the invention is to make the automatic selection means as convenient as possible, of small dimensions and of pleasing shape, so that the equipment can be installed in workplaces and on benches without taking up an inordinate amount of space and so that it is easy to operate.

In automatic selection means for impulse controlled equipment such as remote signalling or electric communication equipment, comprising a selection store in the form of a fully supervisable multipath controller, an impulse sender and a blocking device which blocks the transmission of impulses when a set number of impulses in one impulse group has been reached, the above problems are solved in that the selection store is equipped with a sensing means in the form of a rotating step switch coupled mechanically-electrically or electronically to the impulse sender and in turn coupled by a stepping mechanism to a decade step switch, and in that the blocking device is in the form of a bridging contact to the impulse sender and is associated with a delaying device having a time constant which determines the minimum interval between impulse groups.

The use of an multipath controller makes it possible for the pre-selected impulse groups, once set, to be maintained in their entirety until the user himself alters the settings after the impulses have been automatically transmitted one or more times. This reliably prevents erroneous pre-selection and consequently the transmission of incorrect impulses. With the automatic selection means according to the invention it is possible to use a self-synchronizing impulse sender of the simplest construction and to control only the blocking device with the selection store. This simple measure greatly increases operating safety as compared with known arrangements since it is no longer necessary for the impulse sender itself to be controlled at great constructional expense according to the pre-selected impulse numbers. It is now possible to make do with only one step switch which cooperates with a decade step switch to send out all the impulse sequences occurring. The coupling of the rotating step switch with the impulse sender means that when the set impulses in a group have been sensed the remaining impulses in the group are blocked. It is an advantage for the blocking device, for example in the form of a relay, to be designed as a bridging contact to the impulse sender. Of a fixed number of impulses, only the pre-selected number consequently becomes effective. According to the invention a delaying device, for example in the form of idle positions of the rotating step switch, assigns to the blocking device a time constant which determines the minimum interval between impulse groups. This is an important simplification as compared with conventional selecting equipment in which the control of the impulse sender with the necessary interval between impulse groups involves a high structural outlay since the interval may be different depending on the type of installation and one must not fall below it.

In an advantageous embodiment of the invention production costs and the dimensions of the automatic selecting means are further reduced in that the switching means of the selection store, of the sensing means and of the impulse sender are mounted on a printed circuit. For each impulse group a contact slide may be provided to adjust the number of impulses in the group.

In a preferred embodiment of the invention the impulse sender and step switch are driven from a common motor. It is also an advantage for the delaying device to be in the form of an arcuate elongated contact at the step switch. Other embodiments are characterized in that the blocking device is in the form of a relay and in that a starting means is provided and designed for manual operation or to respond to an electric signal.

It is also possible for the automatic selecting process to be reduced to the shortest possible time when few impulse groups are set, the multipath controller being equipped with switching positions for stopping the selection process when the impulse groups are not adjusted.

Figure 2:
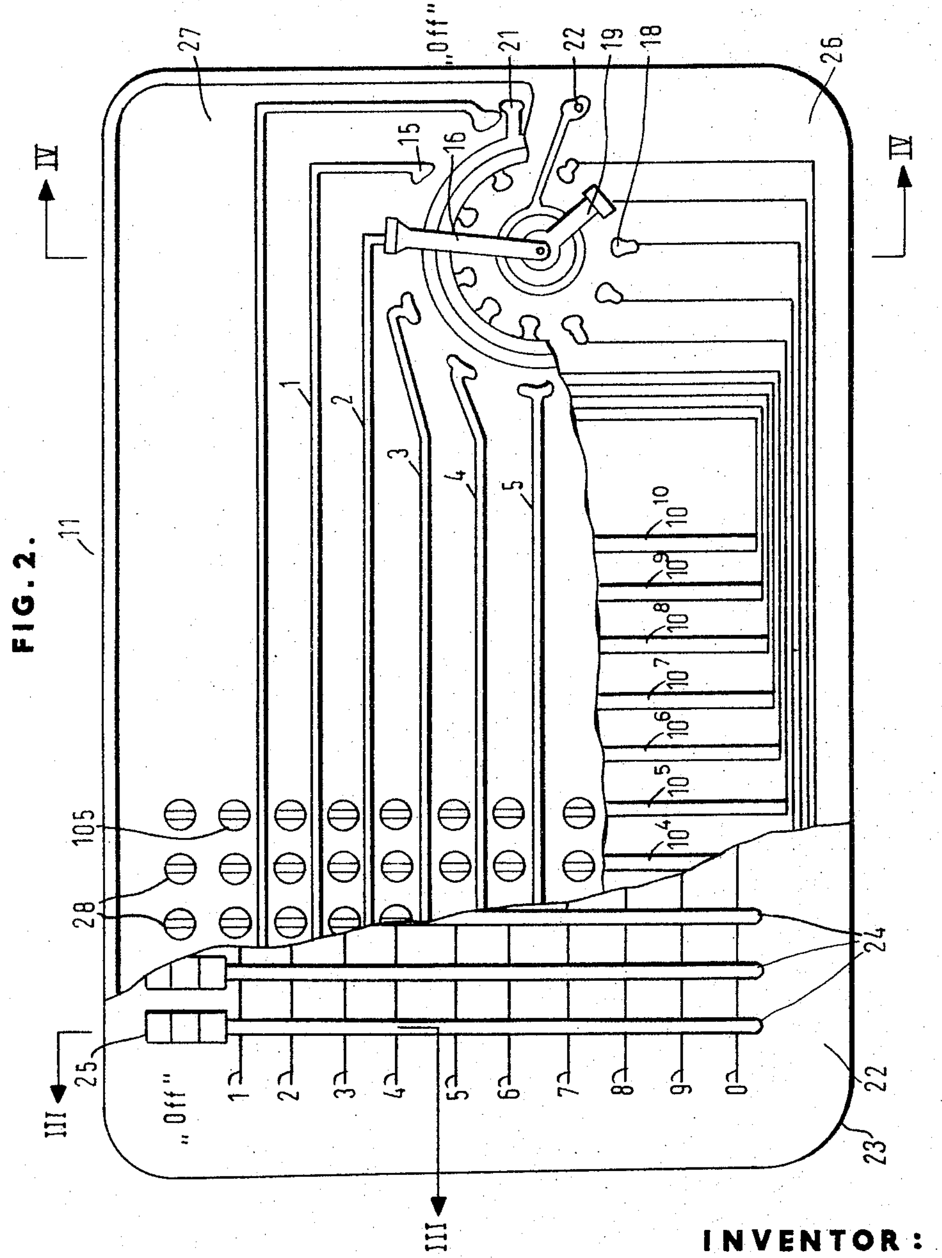
Figure 3:
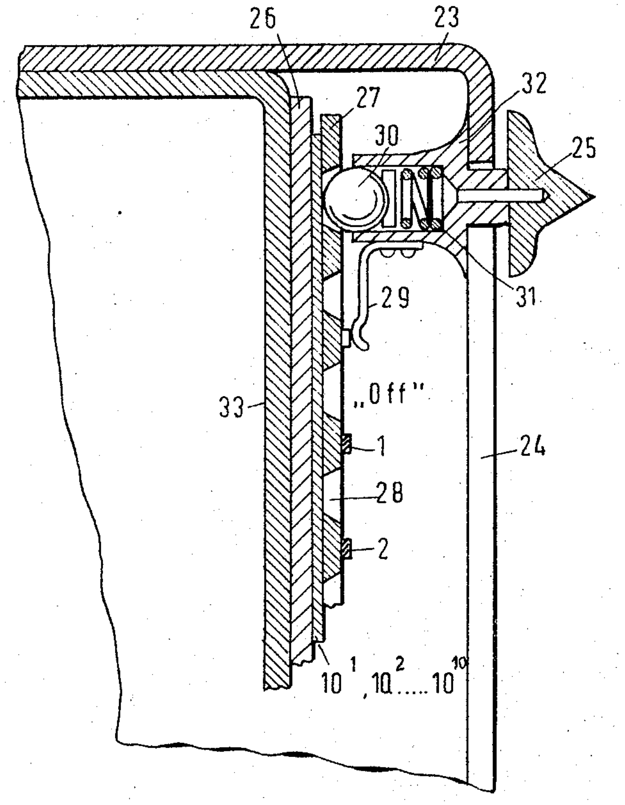
Figure 4:
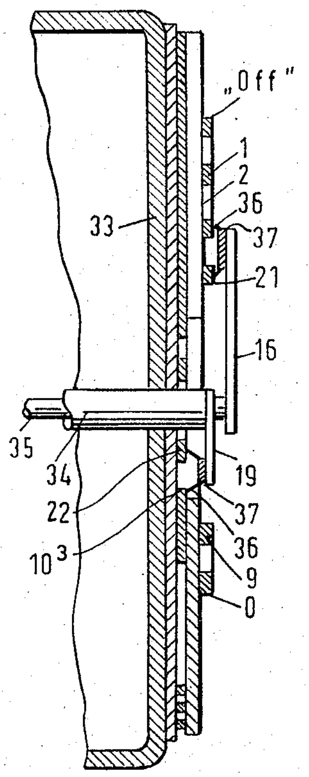
Figure 5:
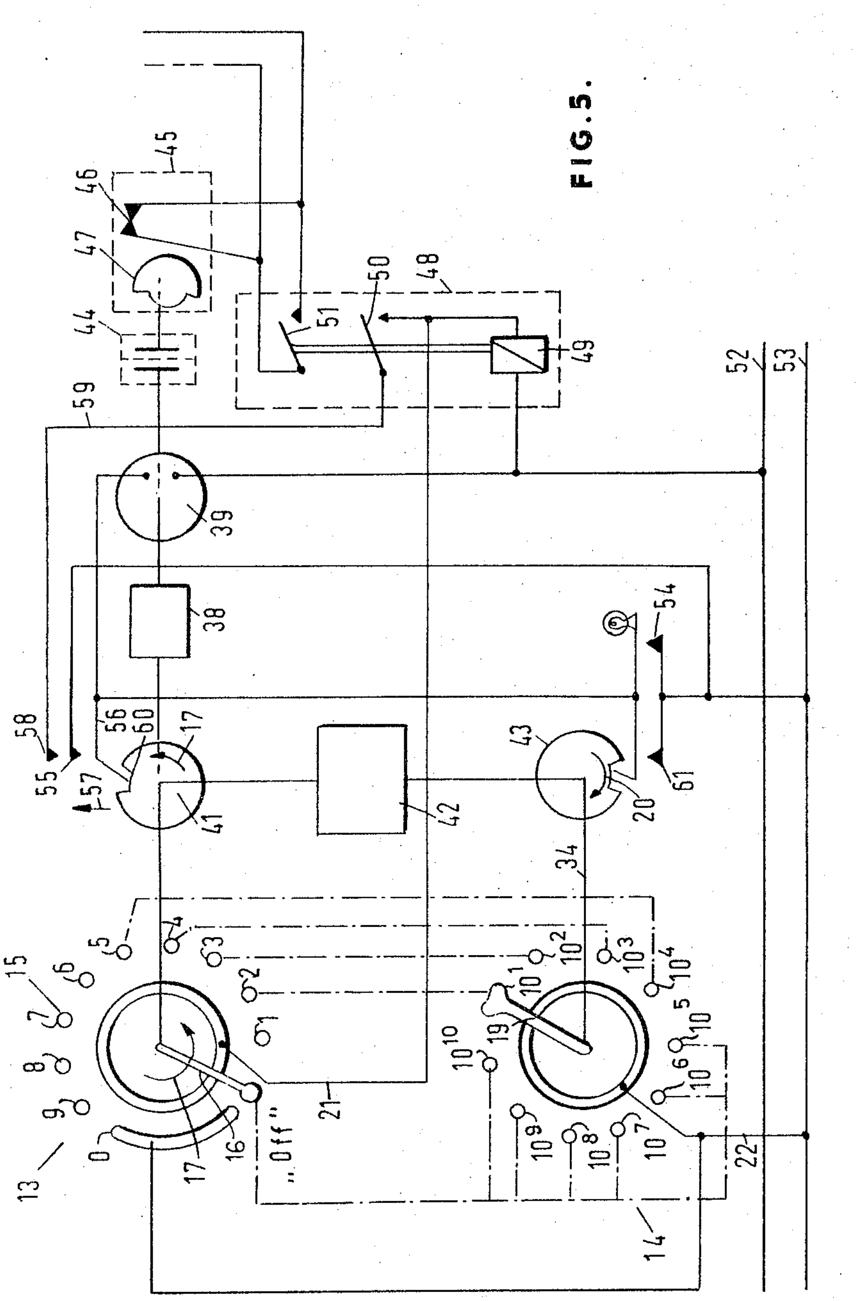
Figure 6:
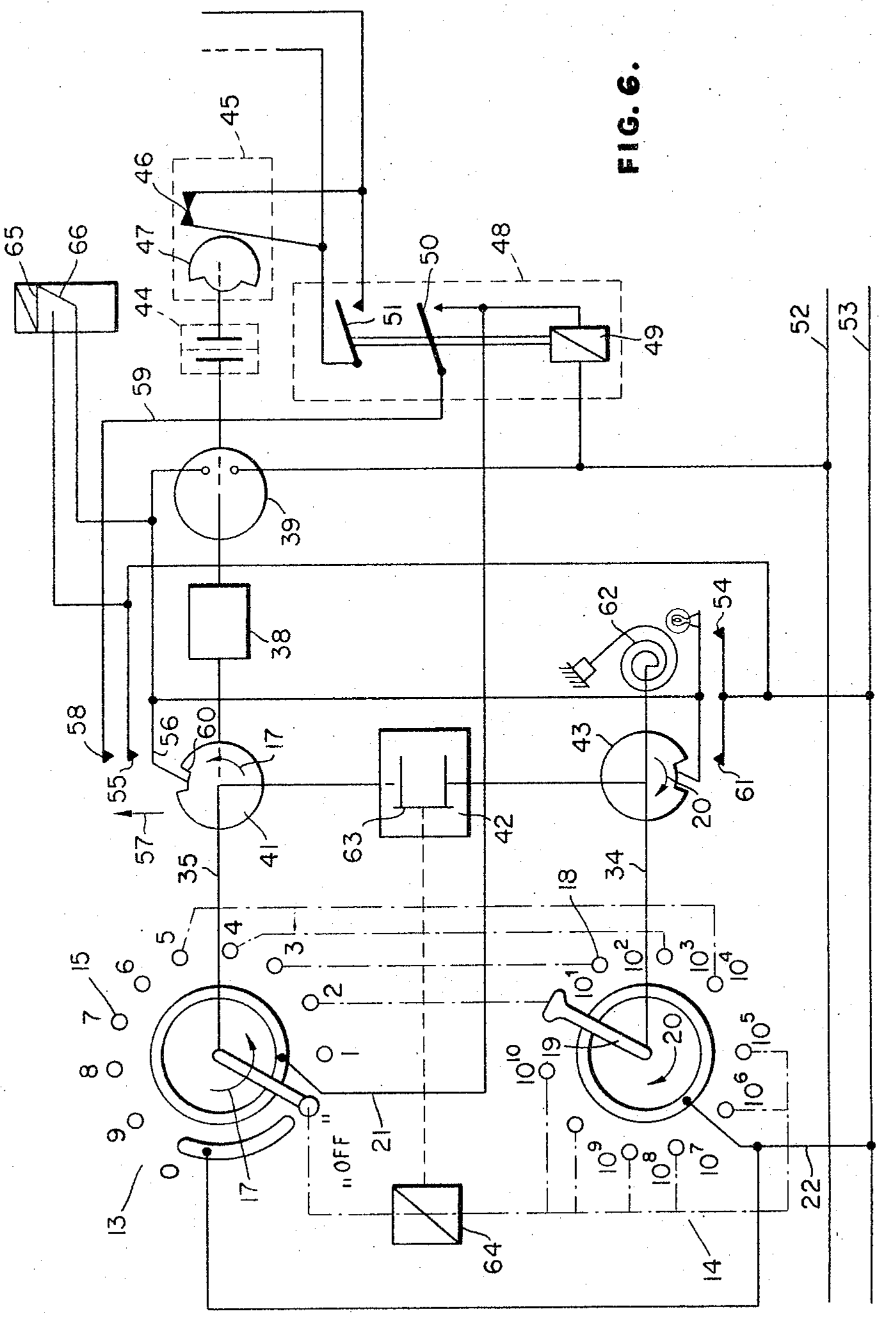

The invention will now be further explained below with reference to the accompanying drawings. The various figures show both the principle of the invention and the constructional features of a preferred embodiment, and further features and advantages of the invention will become apparent from the various figures and the descriptions relating thereto. In the drawings:

FIG. 1 is a diagram showing a multipath controller for pre-selecting impulse groups, combined with a sensing means, FIG. 2 is a diagrammatic part-sectional plan view of a preferred embodiment of the invention, FIG. 3 is a partial section along the line III—III in FIG. 2, on an enlarged scale, FIG. 4 is a section along the line IV—IV in FIG. 2, FIG. 5 is a basic circuit diagram for the invention and FIG. 6 is a diagram of another embodiment of the invention.

FIG. 1 shows diagrammatically a selection store which, according to the invention, comprises a fully supervisable multipath controller 11 and a sensing means 12. In the example illustrated the means 12 is mechanical-electrical and is equipped with an impulse step switch 13 and a decade step switch 14 coupled together mechanically or mechanically-electrically. The setting markings of the multipath controller 11 are combined into impulse groups, for example into the decades $10^1$, $10^2$, $10^3$ etc. to $10^{10}$, each of which is associated with ten impulses numbered 0, 1, 2, 3, 4, etc. to 9, like the conventional dials of telephone equipment. The adjustment multiple 11 is also marked "off"; the purpose of this will be explained later. In accordance with the adjustment markings of the multipath controller 11 parallel conductive impulse rails "off," 0, 1, 2, 3, 4, etc. to 9, are provided and are associated with vertical parallel decade rails $10^1$, $10^2$, $10^3$ etc. to $10^{10}$, in the manner of a matrix and insulated from the impulse rails. With suitable switching means (not shown in FIG. 1) it is possible to establish a conductive connection with one of the decade rails between each of the impulse rails. For each impulse rail the impulse step switch 13 has a switching contact 15 which in FIG. 1 bears the same reference numeral as the impulse rail with which an electrically conductive connection is established. The step switch 13 has a wiper 16 rotating in the direction of the arrow 17 and consequently sensing the impulse rails in a downward direction in the order in which they are mounted. The decade step switch 14 is equipped with switching contacts 18 bearing the same references as the decade rails to which they are conductively connected. The decade wiper 19 of the switch 14 rotates in the direction of the arrow 20 and thus senses the various decade rails in the order of their place value. For the explanation which now follows of the operation of the invention it will be assumed that the number 2345 has been pre-selected by the automatic selection means and is to be transmitted by impulses. For this purpose an electrical connection is provided at the multipath controller by suitable switching means which will later be described, between the impulse rail 2 and the decade rail $10^1$, between the impulse rail 3 and the decade rail $10^2$; between the impulse rail 4 and the decade rail $10^3$ and between the impulse rail 5 and the decade rail $10^4$, the remaining decade rails $10^5$ to $10^{10}$ remaining electrically connected to the "off" rail. All the connections just described are clearly indicated by circles in FIG. 1. While the decade wiper 19 remains on the contact $10^1$ the wiper 16 begins to rotate in the direction of the arrow 17. At the same time as the wiper 16 rotates an impulse sender (not shown in FIG. 1) begins to generate impulses, namely one impulse during each partial advance of the wiper 16 in the direction of the arrow 17 from 1 contact 15 of the impulse step switch 13 to the next contact 15, so that by the time that the contact 15 elecrically connected to the impulse rail 2 is reached, two impulses are transmitted. However, as soon as the wiper 16 reaches the contact 15 electrically connected to the impulse rail 2 the circuit from the wiper lead 21 to the wiper lead 22 is closed and a blocking device (not shown in FIG. 1) is energised and blocks transmission of impulses subsequently generated by the impulse sender for the decade $10^1$. The impulses transmitted are consequently shown with two plus signs and the eight following ones with minus signs at the decade rail $10^1$ in FIG. 1. While the wiper 16 is moving in the direction of the arrow 17 from the contact 15 connected to the impulse rail 0 up to the next contact connected to the "off" rail, the wiper 19 of the decade step switch 14 is advanced in the direction of the arrow 20 to the contact 18 electrically connected with the decade rail $10^2$. This is symbolised at the adjustment multiple 11 by the broken line drawn from the intersection of the impulse rail 0 with the decade rail $10^1$ to the intersection of the "off" rail with the decade rail $10^2$ in FIG. 1. The above process is now repeated; during the sensing of the decade rail $10^2$ three impulses generated by the impulse sender are passed through and the remaining seven blocked by the blocking device (not shown). The process is repeated until, after the decade rail $10^4$ has been sensed by the wiper 16 of the step switch 13 and when the contact 15 connected to the "off" rail is reached, the circuit through the wiper leads 21, 22 is closed, so that during the sensing of the remaining decade $10^5$ to $10^{10}$ all the impulses generated by the impulse sender are blocked and consequently remain ineffective.

The purpose of this detailed explanation of FIG. 1 was to disclose an important inventive idea which is characterized in that an impulse sender constantly generates impulses but these are transmitted for each decade present only in the order of magnitude of preselection, whereas although the remaining decade impulses are generated by the impulse sender they are blocked and thus not transmitted.

FIG. 2 shows the multipath controller 11, covered at the top by a cap 23 of insulating material. Provided in the cap 23 are parallel slots 24 through which, by means of slides 25, switching means (not shown in FIG. 2) can be moved in the direction of the decade rails $10^1$, $10^2$, etc., to $10^{10}$, and in a vertical direction to the parallel impulse rails 0, 1, 2, 3 to 9, and the "off" rail. The decade rails $10^1$ to $10^{10}$ are provided on a lower supporting plate 26 in the form of a printed circuit and are electrically connected to the contacts 18 also in the form of a printed circuit. The parallel impulse rails 0 to 9 and the "off" rail are arranged on the upper supporting plates 27 again in the form of a printed circuit and are electrically connected to the contacts 15 printed thereon. Holes 28 in the upper supporting plates 27 are provided between the impulse rails and above the "off" rail like rasters and coinciding with the decade rails $10^1$ to $10^{10}$, the number of holes 26 being equal to the number of possible switching positions.

FIG. 3 is a section taken along the line III—III in FIG. 2 on an enlarged scale. It will be seen that the underside of the upper supporting plates 27 is superimposed flat on the top of the lower supporting plate 26 and the decade rails $10^1$ to $10^{10}$ printed thereon. The slide 25 has a sliding contact 29 sensing the impulse rails 0 to 9 and the "off" rail and a second contact, for example in the form of the ball 30, which is pressed through the holes 28 and against the decade rails $10^1$ to $10^{10}$ below by a spring 31. Electrical connections between the rails on the lower supporting plates 26 and those on the upper plates 27 may be established by means of an electrical connection between the sliding contact member 29 and the ball 30, for example in the form of a metal ball guide 32. The plates 26, 27 are fixed on a suitably designed base 33.

FIG. 4 is a section along the line IV—IV in FIG. 2. It illustrates the arrangement of the decade wiper 19 on a hollow shaft 34 through which the drive shaft 35 of the wiper 16 is led. Each of the wipers 16, 19 has contact brushes 36 insulated from the wipers 16, 19 by a nonconductive intermediate layer 37. Because of the use of printed circuits the automatic selection means according to the invention may have small dimensions and may be produced at low cost.

FIG. 5 shows a possible arrangement of a preferred embodiment of the invention wherein the wiper 16 is driven in the direction of the arrow 17 by an electric motor 39 through a reduction gearing 38. The drive shaft 35, on which a trip cam 41 is mounted in addition to the wiper 16, is coupled via a stepping mechanism 42 to the hollow shaft 34 on which a cam plate 43 is mounted as well as the decade wiper 19. As already mentioned, the stepping mechanism 42 is designed so that to each advance of the wiper 16 at the impulse step switch 13 from the beginning of the elongated contact 0 to the "off" contact there corresponds a partial advance of the decade wiper 19 from one contact 18 to the adjacent contact in the direction of the arrow 20. Acting through a gearing 44, the motor 39 drives the impulse sender 45 which is, for example, in the form of an interrupting contact 46 with impulse cams 47. It is an advantage for the gearing 44 to be equipped with a magnetic driving clutch, thus ensuring absolute galvanic separation between the impulse sender 45 and the automatic selection means according to the invention such as is often required for remote signalling installations.

In the preferred embodiment of the invention the blocking device 48 is in the form of a relay 49 with a self-holding contact 50 and a blocking contact 51, the latter being in parallel with the interrupting contact 46. Each end of the coil of the motor 39 and the relay 49 is connected to the potential of a suitable voltage source, for example the line 52 of the permanently conductive telephone lines 52, 53. For the explanation of the circuit diagram in FIG. 5 it is assumed that the number 2345 is to be selected and the corresponding connections consequently to be made with the slides 25 at the multipath controller 11 as indicated by chain lines in FIG. 5. The manual switch 54 is now temporarily operated, whereupon the motor 39 starts and simultaneously sets the impulse cam 47, the drive shaft 35 with the wiper 16 mounted thereon and the cam 41 in rotation in the direction of the arrow 17. As soon as the motor 39 starts, the contacts of the manual switch 54 are bridged by a bridging contact 55, since the contact spring 56 is raised in the direction of the arrow 57 by the moving cam 41, is applied to the contact 55, and in spite of the hand switch 54 being open leads to potential of the line 53 to the motor 39. Through the movement of the contact spring 56 in the direction of the arrow 57 the contact 55 is raised in the direction of the arrow 57. It thereby touches a contact 58, by which the potential of the line 53 is passed through a line 59 to the self-holding contact 50 of the relay 49.

The wiper 16 then passes over an arcuate portion of the impulse step switch 13 between the "off" contact and the contact 2 in the direction of the arrow 17. As already mentioned, the stepping up ratio of the impulse cam 47 is selected so that each time the wiper 16 arrives between one of the contacts 15 at the impulse step switch 13 an impulse is transmitted. Thus two impulses are transmitted before the contact 2 of the impulse step switch 13 is reached. But as soon as the wiper 16 at the impulse step switch 30 reaches the contact 2 the circuit of the relay

49 and consequently the blocking contact 51 is closed according to the setting of the multipath controller 11, so that no further impulses can be transmitted although the impulse cam 47 continues to rotate. Simultaneously with the closing of the blocking contact 51 the self-holding contact 50 is closed so that the relay 49 is fixed in the attracted position, although in the course of further rotation in the direction of the arrow 17 the wiper 16 passes over contacts 15 which, because of the setting of the multipath controller 11, have no electrical connection with one of the decade rails $10^1$, $10^2$ to $10^{10}$. As already mentioned, during the movement of the wiper 16 over the contact 0 to the "off" contact of the impulse step switch 13 the wiper 19 of the decade step switch 14 is driven in the direction of the arrow 20 from the contact $10^1$ to the contact $10^2$. In this decade therefore, according to the setting of the adjustment multiple, three impulses are transmitted and the remaining ones blocked. At the third revolution of the wipers 17 four impulses are then transmitted in the decade $10^3$ and on the fourth revolution the five set impulses in the decade $10^4$. As the remaining decade rails $10^5$ to $10^{10}$ are electrically connected to the "off" rail according to the setting of the multipath controller 11 (see also FIG. 1), the relay 49 is energised as soon as the wiper 16 reaches the "off" contact. During the remaining revolutions thereof, in the course of which the wiper 19 of the decade step switch 14 is advanced, each time, the length of one decade contact in the direction of the arrow 20, the relay 49 therefore blocks transmission of all further impulses although the impulse cam 47 is kept constantly in rotation. Each time the wiper 16 of the impulse step switch 13 passes over the "off" contact the contact spring 56 drops into the recess 60 in the cam 41 in the opposite direction to the arrow 57, thus breaking the connection between the bridging contact 55 and the contact 58. In this way the circuit through the self-holding contact 50 is broken, so that the opening blocking contact 51 allows impulses to be transmitted for the set number of impulses at the beginning of each new decade revolution. The dropping of the contact spring 56 in the opposite direction to the arrow 57 simultaneously de-energises the bridging contact 55, but in the FIG. 5 arrangement a second bridging contact 61 is closed even at the first partial advance of the decade wiper 19 in the direction of the arrow 20 by means of the cam plate 43. The circuit of the motor 39 remains closed until the decade wiper 19 has completed a full revolution in the direction of the arrow 20 and has again reached the contact $10^1$. The interruption of the motor circuit means that the motor 39 is left in a position in which the wiper 16 has reached the "off" contact at the impulse step switch 13, whereupon the selection process is over. In order to ensure the necessary interval between each decade, the so-called minimum impulse group interval, a delaying device must be provided and must become effective when all ten impulses in a decade have been preselected. In the FIG. 5 embodiment this delaying device is provided at the impulse step switch 13 in the form of an arcuate elongated contact 0 connected to the wiper lead 22. As soon as the wiper 16 has reached the contact 0 the circuit of the relay 49 is closed and the transmission of impulses blocked until the wiper 16, after passing over the elongated contact 0, has reached the "off" contact; the delay operates with a time constant adapted to the minimum impulse group interval.

Although, because of the rapid rotation of the wiper 16, sensing of all ten decades takes place in a relatively short time, it may nevertheless be desirable to sense only those decades for which impulses have been pre-selected at the multipath controller 11 and to return the decade wiper 19 for sensing these impulses in the opposite direction to the arrow 20 into the starting position at the contact $10^1$, so that the second bridging contact 61 breaks the circuit of the motor 39 and any further sensing of non-adjusted decades is omitted. A possible embodiment for such returning means is shown in FIG. 6. As shown, the embodiment comprises a return spring 62 on the hollow shaft 34 and a dividing clutch 63 in the stepping mechanism 42, the clutch being controlled by a magnetic coil 64. The winding of the magnetic coil 64 is placed in the connecting lead between the "off" impulse rail and the "off" contact of the impulse step switch 13 (see also FIG. 1), so that each time current reaches the "off" impulse rail the dividing clutch 63 is opened and the decade wiper 19 springs into the position of rest in the opposite direction to the arrow 20 by the action of the return spring 62.

It is also possible of course for the automatic selecting means to be started not only by the switch 54 but automatically, for example when the engaged and/or free signal of a telephone installation sounds. As shown in FIG. 6, such automatic starting means may, for example, comprise a switching relay 65 adapted to the frequency of the engaged and/or free signal; bridging contact 66 of relay 65 is connected in parallel with the contact of the manual switch 54.

Although the figures show and describe a possible embodiment of the invention with a mechanically operated impulse sender and with mechanical-electrical sensing means, it should be noted that the scope of the invention and of the following claims would not be exceeded if electronic components were used instead of mechanically moved and mechanically-electrically constructed ones. For example, the sensing means may be equipped with transistors controlled with a delay, the time constant of the delay depending on the rotating time of the mechanically controlled step switch. The impulse sender may be in the form of a switching transistor with a driver stage in a bistable trigger circuit, its synchronisation being freed or blocked in each case by the transistors of the sensing means.

I claim:

1. Impulse sender, especially for telephone equipment, by means of which telephone numbers can be automatically sent out through the setting of a number setting device and wherein a constantly impulsing impulse sender, interpolated in subscriber's line during the use of the impulse sender, is provided with a blocking device which renders ineffective by short-circuiting of the impulse sender as many of the impulses as must be absorbed in order to produce the desired subscriber's number, wherein the number setting device is provided with contact blocks insulated from one another and conductively connectable at selectable points for the group-wise sub-division of the train of impulses and for the forming of the numbers, characterized in that the contact blocks are superpositioned contact rails arranged in the manner of matrix, which are connectable by means of a slide provided with a first sensor means, penetrating the upper contact rails and sensing the lower contact rails, as well as with second sensor means, sensing the upper contact rails.

2. Impulse sender according to claim 1, characterized in that said first sensor means is in the form of a ball and in that said slide is provided with a guide for said ball first sensor means to which said second sensor means is attached.

3. Impulse sender according to claim 1, characterized in that the upper contact rails and lower contact rails are in the form of a printed circuit on respective supporting plates provided therefor.

4. Impulse sender according to claim 3, characterized in that the upper supporting plate is provided with holes which permit the penetrating of the first sensor means until making contact with the lower contact rails.

5. Impulse sender according to claim 4, characterized in that the holes are arranged in such a way to be situated above the points of intersection of the upper and the lower contact rails.

6. Impulse sender according to claim 3, characterized in that the supporting plates rest on a base, said base carrying a bearing for a drive shaft and a hollow shaft, said shafts having wipers mounted thereon which connect concentrically arranged switching contacts connected to said contact rails according to a desired number setting.

7. Impulse sender according to claim 6, characterized in that said switching contacts are in the form of a printed circuit arranged on said supporting plates corresponding to said contact rails.

8. Impulse sender according to claim 6, characterized in that said switching contacts are arranged at one end of said supporting plates and, whereas, starting from the other end, slots are provided for the guidance of said slides.

References Cited

UNITED STATES PATENTS

| | | | |
|---|---|---|---|
| 790,966 | 5/1905 | Lorimer | 179—90 |
| 3,062,921 | 11/1962 | White | 179—90 |
| 3,078,349 | 2/1963 | Sasaki | 179—90 |

KATHLEEN H. CLAFFY, *Primary Examiner.*

THOMAS B. HABECKER, *Examiner.*

A. H. GESS, *Assistant Examiner.*